United States Patent
Butler et al.

(10) Patent No.: US 9,713,901 B2
(45) Date of Patent: Jul. 25, 2017

(54) METHOD TO REDUCE RESIDUAL STRESS IN AN INTEGRALLY-STIFFENED CO-BONDED STRUCTURE

(71) Applicant: The Boeing Company, Chicago, IL (US)

(72) Inventors: Geoffrey A. Butler, Seattle, WA (US); Robert Courdji, Everett, WA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 14/723,355

(22) Filed: May 27, 2015

(65) Prior Publication Data

US 2016/0346995 A1   Dec. 1, 2016

(51) Int. Cl.
*B29C 65/66* (2006.01)
*B29C 65/00* (2006.01)
(Continued)

(52) U.S. Cl.
CPC .... *B29C 66/43441* (2013.01); *B29C 65/5057* (2013.01); *B29C 66/343* (2013.01); *B29C 66/496* (2013.01); *B29C 66/524* (2013.01); *B29C 66/532* (2013.01); *B29C 66/61* (2013.01); *B29C 66/721* (2013.01); *B29C 66/73751* (2013.01); *B29C 66/73752* (2013.01); *B29C 66/73755* (2013.01); *B29C 66/73941* (2013.01); *B29C 66/81455* (2013.01); *B29C 70/342* (2013.01); *B29C 65/483* (2013.01); *B29C 66/342* (2013.01); *B29C 66/71* (2013.01);
(Continued)

(58) Field of Classification Search
None
See application file for complete search history.

(56) References Cited

U.S. PATENT DOCUMENTS 5,484,277 A * 1/1996 Lindsay ............. B29D 99/0014
                                                    249/134
5,538,589 A * 7/1996 Jensen .................. B29C 69/004
                                                    100/211
(Continued)

OTHER PUBLICATIONS

Jain LK, et al "Spring-in study of the aileron rib manufactured from advanced thermoplastic composites", Composites Part A, 29A (1998) pp. 973-979.*

(Continued)

*Primary Examiner* — Jeff Aftergut

(57) ABSTRACT

A method of reducing residual stress in a composite assembly may include assembling a first composite part to a second composite part to form a detail assembly. The first and second composite part may each have a flange and a web connected by a bend radius. The webs may be arranged back-to-back. The detail assembly may be cured on a compensated cure tool compensated for cure shrinkage spring-in predicted to occur in the first and second composite part. The method may include allowing the first and second composite part to spring in from cure shrinkage, and assembling the detail assembly to an uncured third composite. The method may also include co-bonding the detail assembly to the third composite part on an assembly cure tool to form a composite assembly having reduced cure shrinkage residual stress in the bend radii of the first and second composite part.

20 Claims, 16 Drawing Sheets

(51) Int. Cl.
    *B29C 65/50*     (2006.01)
    *B29C 70/34*     (2006.01)
    *B29K 63/00*     (2006.01)
    *B29K 105/08*    (2006.01)
    *B29L 31/30*     (2006.01)
    *B29C 65/48*     (2006.01)

(52) U.S. Cl.
    CPC .... *B29C 66/7212* (2013.01); *B29C 66/72141* (2013.01); *B29K 2063/00* (2013.01); *B29K 2105/0872* (2013.01); *B29L 2031/3082* (2013.01); *B29L 2031/3085* (2013.01)

(56) References Cited

U.S. PATENT DOCUMENTS

| | | | |
|---|---|---|---|
| 9,440,725 B2 * | 9/2016 | Outon Hernandez | .. B64C 1/064 |
| 2014/0099477 A1 | 4/2014 | Matsen et al. | |
| 2014/0186588 A1 * | 7/2014 | Victorazzo | ............. B64C 1/064 |
| | | | 428/178 |

OTHER PUBLICATIONS

Ersoy, N, et al, "Modeling of the spring-in phenomenon in curved parts made of a thermosetting composite", Composites Part A 41 (2010) pp. 410-416.*

Albert, "Spring-in and warpage of angled composite laminates," Composites Science and Technology 62 (2002) 1895-1912, Jun. 14, 2002.

* cited by examiner

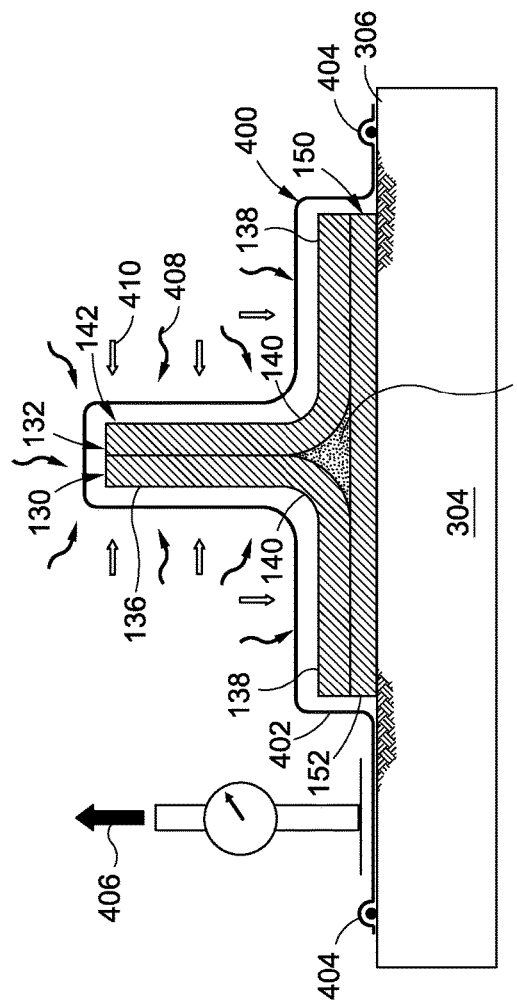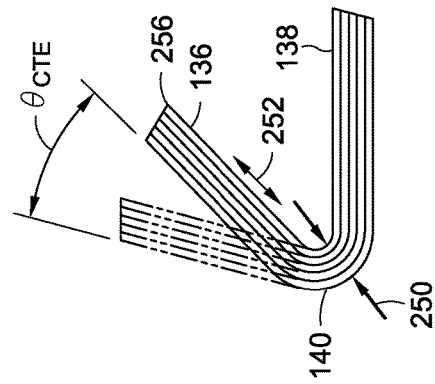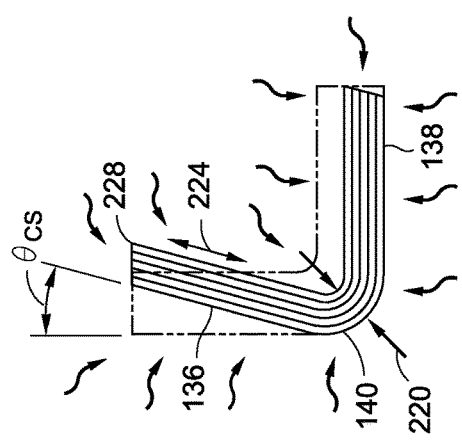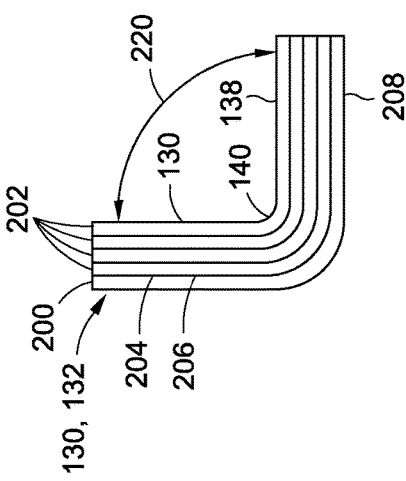

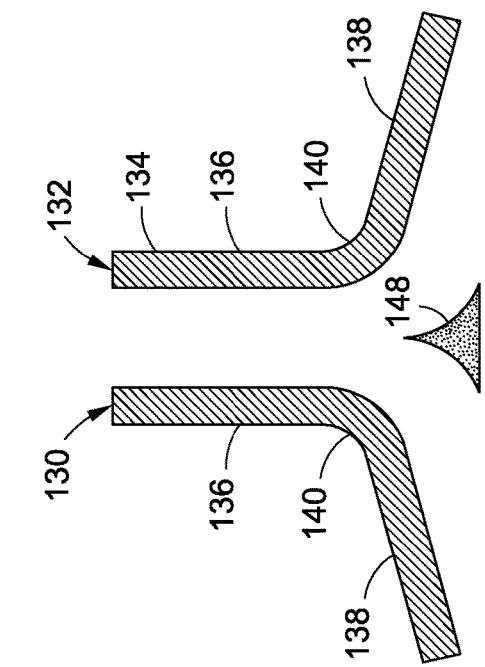
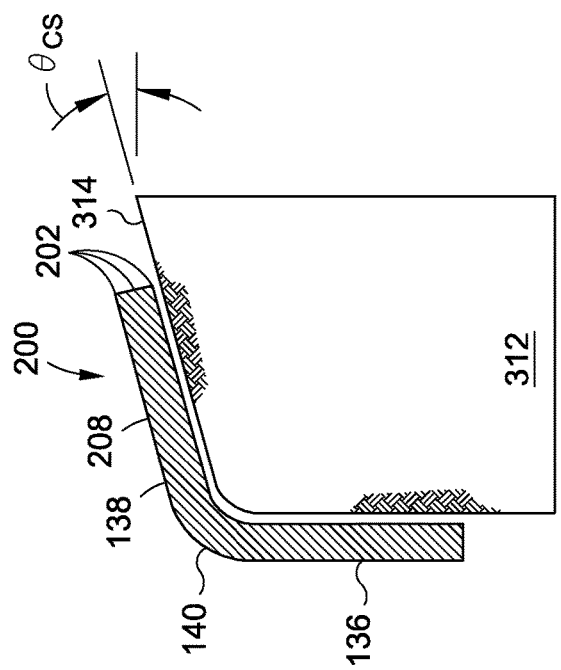
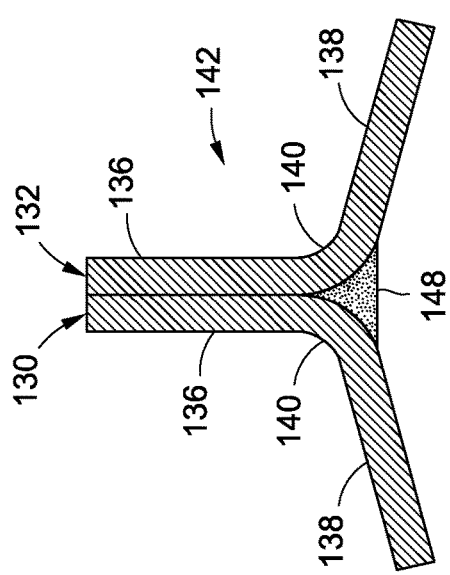
FIG. 17
FIG. 18
FIG. 16

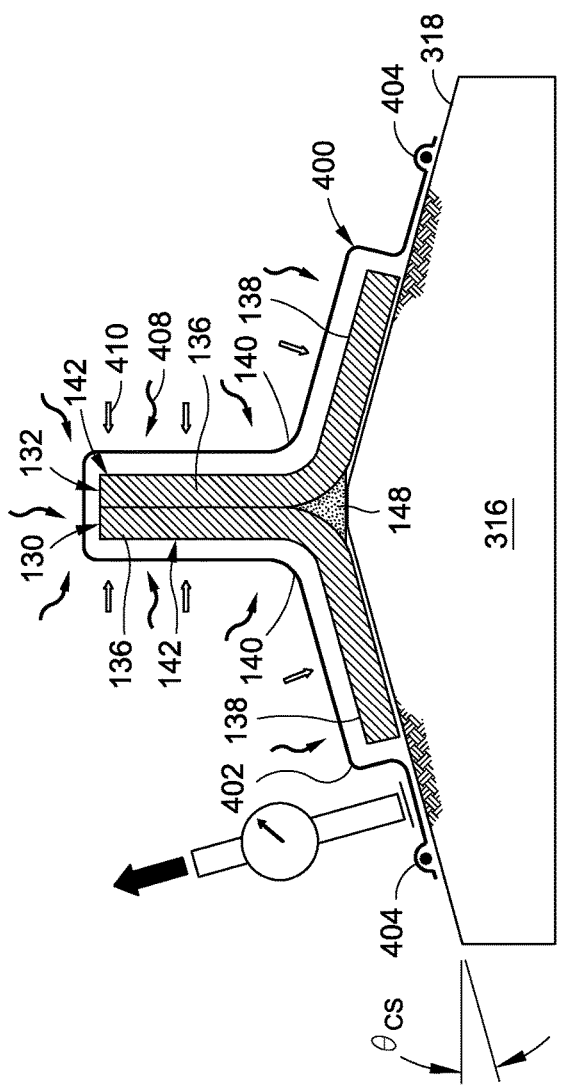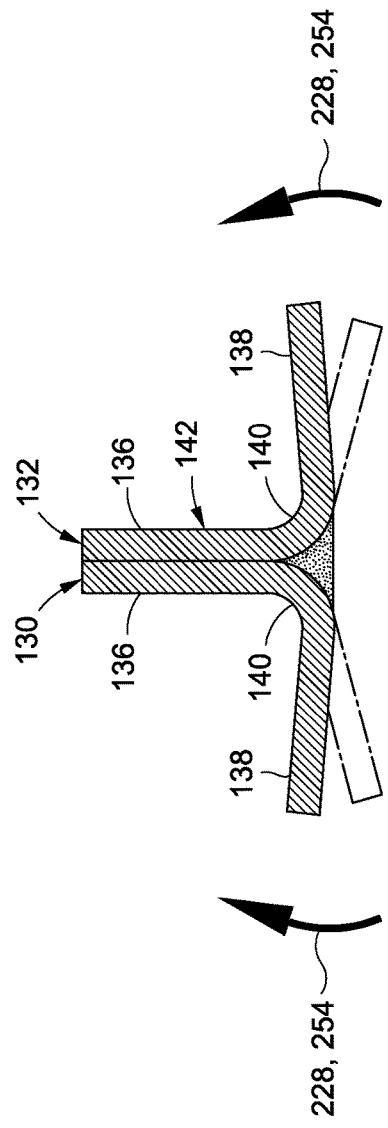

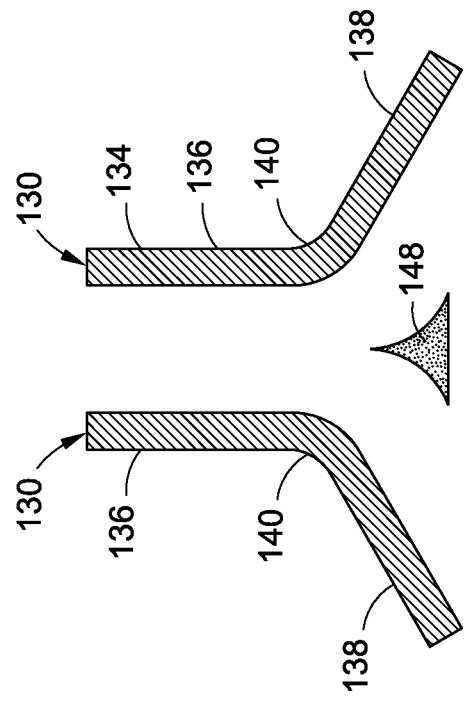
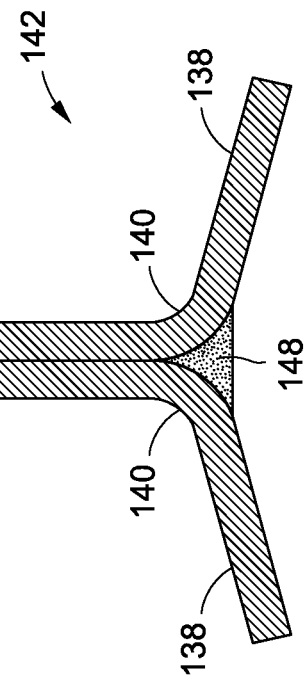
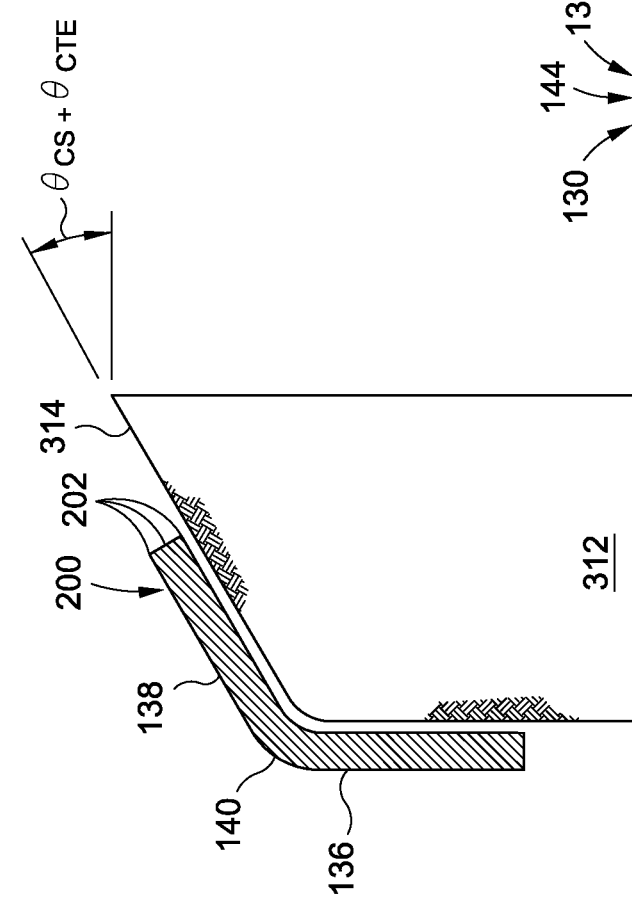
FIG. 25
FIG. 26
FIG. 24

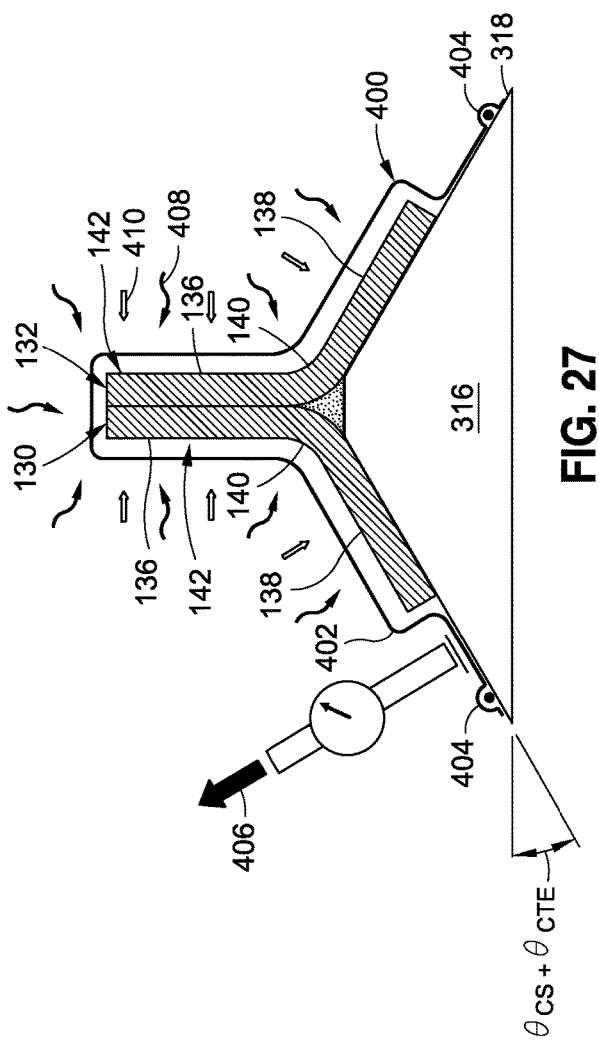
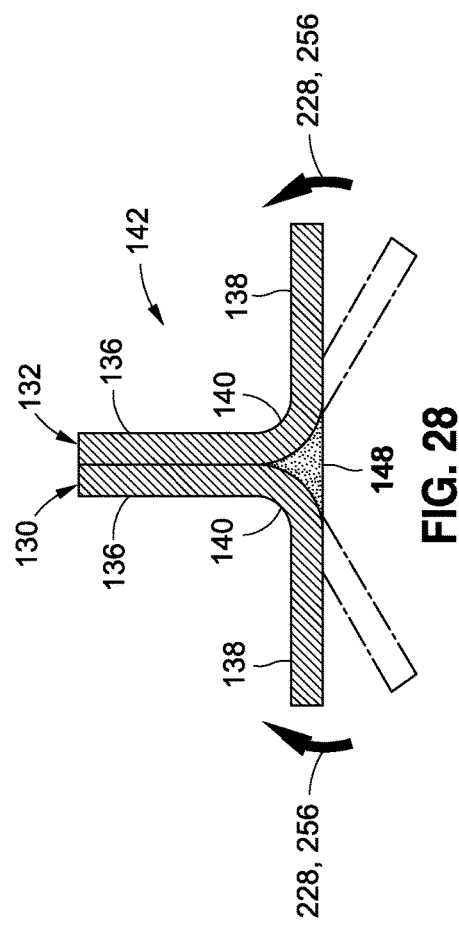

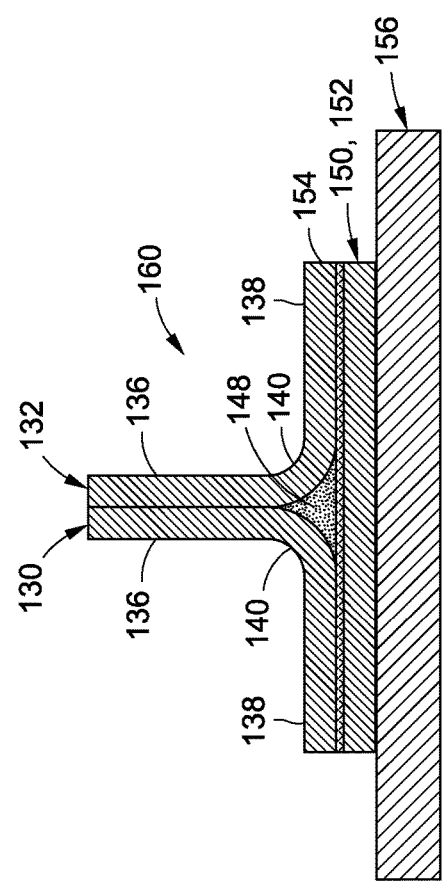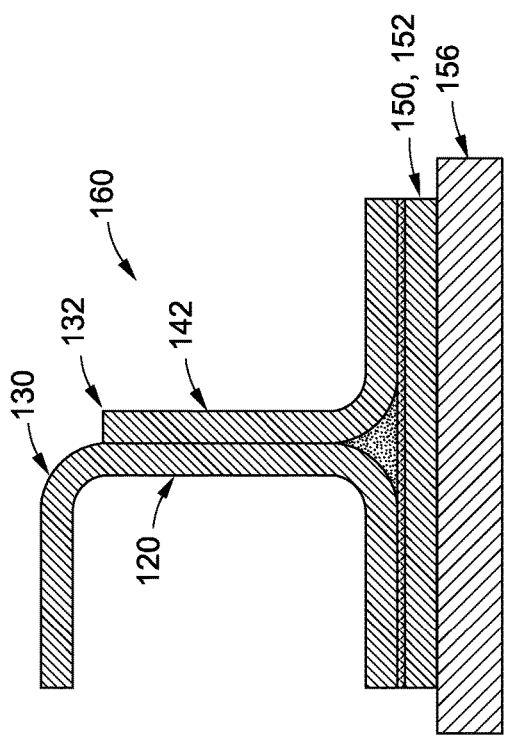

METHOD TO REDUCE RESIDUAL STRESS IN AN INTEGRALLY-STIFFENED CO-BONDED STRUCTURE

FIELD

The present disclosure relates generally to the manufacturing of composite structures and, more particularly, to a method of reducing residual stress in a composite assembly.

BACKGROUND

Conventional methods of forming stiffened composite structures may involve assembling uncured composite parts to form an uncured detail assembly of a stiffener. The composite parts may include a flange and a web interconnected by a bend radius. The detail assembly may also include a radius filler which may be encapsulated by a base laminate. The base laminate may constrain the flanges of the composite parts against spring-in which may occur due to resin shrinkage (e.g., chemical shrinkage) during curing of the detail assembly. In addition, the base laminate may also constrain the flanges against thermally-induced spring-in which may occur as the detail assembly cools down from the cure temperature to room temperature. The cured detail assembly may be co-bonded to an uncured layup such as a skin panel as a means to stiffen the skin panel.

Unfortunately, the constrainment of the flanges against spring-in may result in relatively high through-thickness residual tension in the bend radii and in the radius filler. The through-thickness residual tension may be locked into the detail assembly during co-bonding, and may result in undesirable effects on the stiffened skin panel such as a reduction in load-carrying capability. The magnitude of residual stress due to resin shrinkage and thermally-induced spring-in may generally increase with increasing laminate thickness. As a result, laminate thicknesses must be further increased so that the skin panel is capable of carrying the design loads. For weight-sensitive structures such as aircraft, an increase in laminate thickness may correspond to an increase in the structural mass of the aircraft which may have a detrimental effect on aircraft performance such as climb rate, payload-carrying capability, range, and/or fuel efficiency.

As can be seen, there exists a need in the art for a method of reducing residual stress in a composite assembly.

SUMMARY

The above-noted needs associated with reducing residual stress in composite assemblies are specifically addressed and alleviated by the present disclosure which provides a method that includes assembling a first composite part to a second composite part to form a detail assembly. The first and second composite part may each have a flange and a web connected by a bend radius. The webs may be arranged in back-to-back contact with one another. The method may further include curing the detail assembly on a compensated cure tool compensated for cure shrinkage spring-in predicted to occur in the first and second composite part during curing of the detail assembly. In addition, the method may include allowing the first and second composite part to spring in from the cure shrinkage after curing of the detail assembly. Additionally, the method may include assembling the detail assembly to a third composite part that is uncured and which may extend across the flanges of the first and second composite part. The detail assembly may be co-bonded to the third composite part on an assembly cure tool to form a composite assembly having reduced cure shrinkage residual stress in the bend radii of the first and second composite part.

Also disclosed is a method of forming an integrally-stiffened panel assembly. The method may include assembling a first composite part, a second composite part, and a radius filler to form an uncured detail assembly. The first and second composite parts may each have a flange and a web connected by a bend radius. The webs of the first and second composite part may be arranged in back-to-back contact with one another and may form a notch between the bend radii for receiving the radius filler. The method may additionally include curing the detail assembly on a compensated cure tool with the radius filler and the flanges of the first and second composite part supported on a tool surface that may be compensated for cure shrinkage spring-in and thermally-induced spring-in.

In addition, the method may include allowing cure shrinkage spring-in and thermally-induced spring-in to occur in the flanges of the first and second composite part after curing of the detail assembly. Also, the method may include assembling the detail assembly to an uncured base laminate and an uncured skin panel located beneath the base laminate and supported on an assembly cure tool. An adhesive layer may be installed between the base laminate and the detail assembly. The base laminate may extend across and interconnect the flanges of the first and second composite part. The method may include co-bonding the detail assembly to the uncured base laminate and uncured skin panel on the assembly cure tool to form an integrally-stiffened panel assembly with reduced or non-existent cure shrinkage residual stress and with reduced or non-existent thermally-induced residual stress in the radius filler and/or the bend radii of the first and second composite part.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 8 is a side view of a conventional detail assembly during curing on a conventional cure tool;

FIG. 9 is a sectional view of a composite laminate prior to curing;

FIG. 10 is a sectional view of the composite laminate of FIG. 9 showing the cure shrinkage spring-in of the composite laminate due to shrinkage of the resin during cure;

FIG. 11 is a sectional view of the composite laminate of FIG. 10 showing thermally-induced spring-in of the composite laminate occurring during cool-down from the cure temperature to room temperature;

FIG. 14 is a side view of the cured conventional composite assembly having residual stress in the bend radii and in the radius filler due to constrainment of the first and second composite part against spring-in;

FIG. 16 is a side view of a composite part formed as a composite laminate laid up on a compensated layup tool having a tool surface compensated for cure shrinkage;

FIG. 17 is an exploded view of a radius filler for assembly with a first and second composite part to form an uncured detail assembly;

FIG. 18 is a side view of an uncured detail assembly comprising the radius filler and the first and second composite part of FIG. 17;

FIG. 19 is a side view of the uncured detail assembly being cured on a compensated cure tool having a tool surface compensated for cure shrinkage spring-in;

FIG. 20 is a side view of the cured detail assembly of FIG. 19 with the curved arrows representing cure shrinkage spring-in of the flanges of the first and second composite part;

FIG. 23 is a side view of cured composite assembly of FIG. 22 having reduced residual stress in the bend radii and radius filler due to the absence of cure shrinkage spring-in;

FIG. 24 is a side view of a composite part formed as a composite laminate laid up on a compensated layup tool having a tool surface compensated for both cure shrinkage spring-in and thermally-induced spring-in of the flanges of the first and second composite part;

FIG. 25 is an exploded view of a radius filler and a first and second composite part as may be assembled to form an uncured detail assembly;

FIG. 26 is a side view of an uncured detail assembly comprising the radius filler and the first and second composite part of FIG. 25;

FIG. 27 is a side view of the uncured detail assembly being cured on a compensated cure tool having a tool surface compensated for both cure shrinkage spring-in and thermally-induced spring-in;

FIG. 28 is a side view of the cured detail assembly of FIG. 27 with the curved arrows representing the cure shrinkage spring-in and the thermally-induced spring-in;

FIG. 31 is a side view of the cured composite assembly of FIG. 30 configured as an integrally-stiffened panel assembly having a blade stringer with reduced residual stress in the bend radii and radius filler due to the absence of cure shrinkage spring-in and thermally-induced spring-in of the flanges of the first and second composite part;

FIG. 32 is a side view of an example of an integrally-stiffened panel assembly having a C-section stringer and which may be manufactured using the methods disclosed herein;

DETAILED DESCRIPTION

Figure 1:
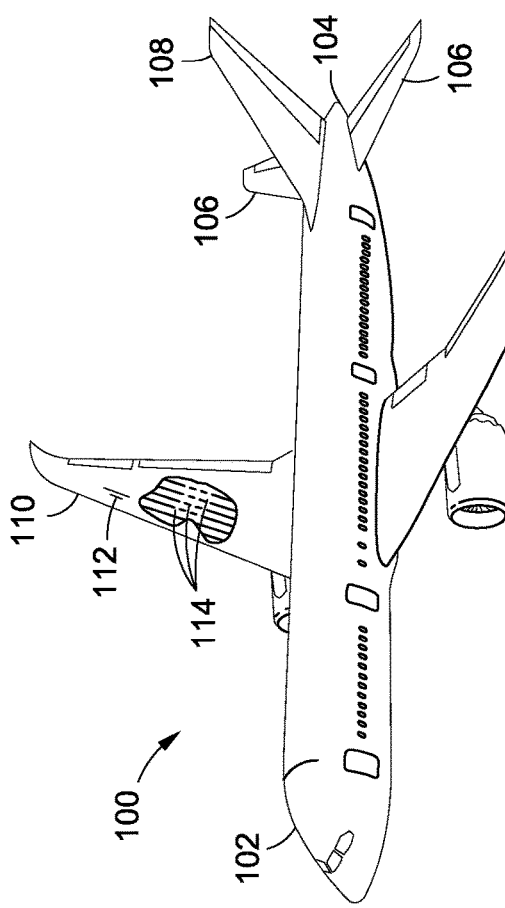
FIG. 1 is a perspective view of an aircraft.

Referring now to the drawings wherein the showings are for purposes of illustrating various examples of the present disclosure, shown in FIG. 1 is a perspective view of an aircraft 100 which may include one or more composite assemblies formed of composite material. For example, the aircraft 100 may include a fuselage 102 which may be formed as a composite assembly 158 comprising circumferential skin panels supported by axially-spaced circumstantial frames (not shown) and longitudinally-extending stringers (not shown) which may be co-bonded to the fuselage skin panels. At an aft end of the fuselage 102, the aircraft 100 may have an empennage 104 including a horizontal tail 106 and a vertical tail 108 which may also be formed as composite assemblies. The aircraft 100 may include a pair of wings 110 which may additionally be formed as composite assemblies.

Figure 2:
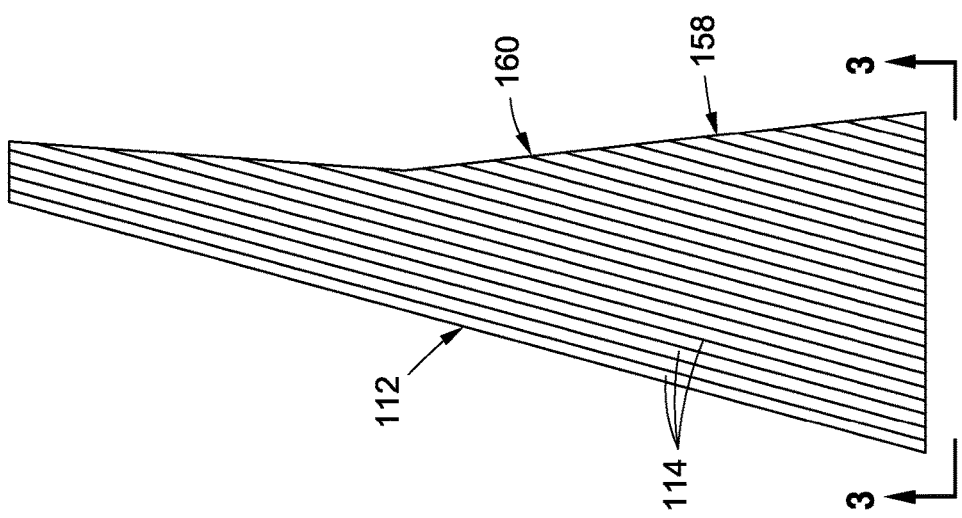
FIG. 2 is a plan view of a wing skin panel having a plurality of integrally-formed stringers for stiffening the skin panel.

FIG. 2 is a plan view of a wing skin panel 112 formed as a composite assembly 158. The wing skin panel 112 may include a plurality of composite stringers 114 that may be laid and cured as individual composite laminates which may be co-bonded with an uncured or partially-cured (e.g., green state) wing skin panel 112 which may also be formed as a composite laminate.

Figure 3:
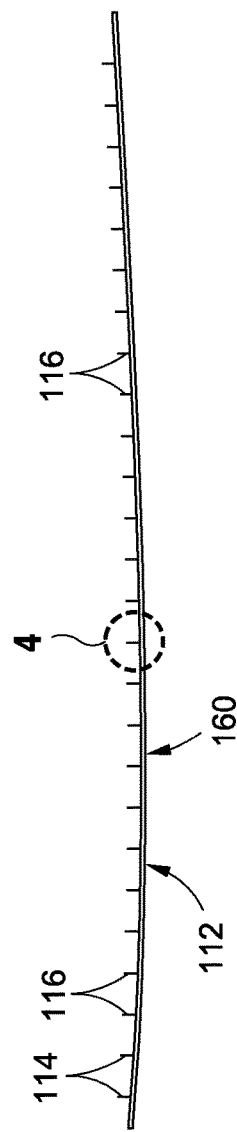
FIG. 3 is an end view of the skin panel of FIG. 2.

FIG. 3 is an end view of the skin panel 112 of FIG. 2 showing the plurality of composite stringers 114 (e.g., blade stringers 116) that may be integrally coupled to the skin panel 112. Although shown as having a plurality of composite stringers 114, a composite structure such as a skin panel may include any number of stringers 114 including a single stringer.

Figure 4:
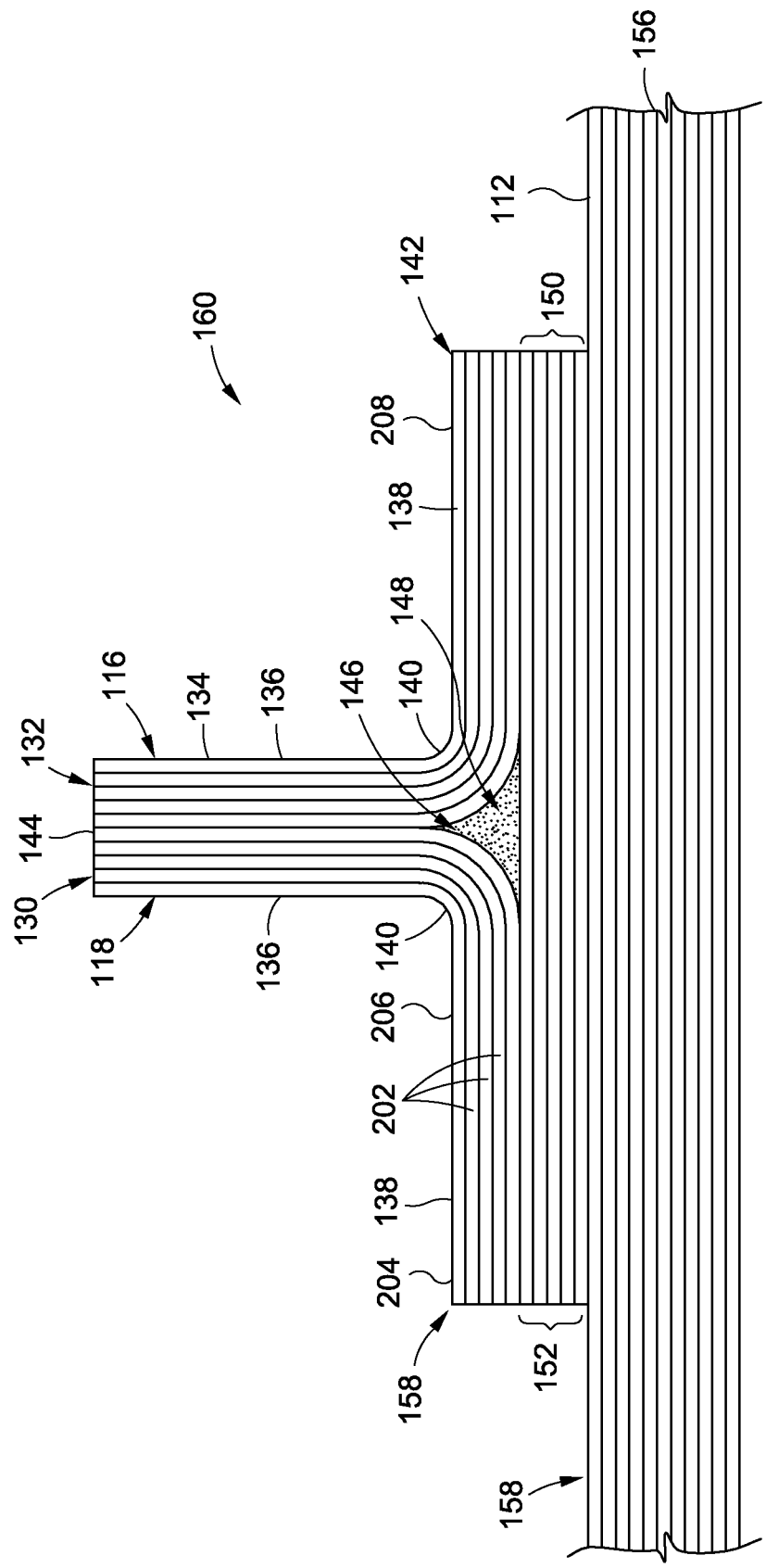
FIG. 4 is a magnified view of a portion of the skin panel of FIG. 3 showing a first composite part, a second composite part, and a base laminate encapsulating a radius filler and mounted to the skin panel.

FIG. 4 is a magnified view of a portion of the skin panel 112 of FIG. 3 showing a first composite part 130, a second composite part, and a third composite part or base laminate 152 encapsulating a radius filler 148 and mounted on the skin panel 112. The first composite part 130 and the second composite part 132 may each be formed as a layup of composite plies 202. The base laminate 152 and the skin panel 112 may also be formed as a plurality of composite plies 202. However, the radius filler 148 may also be formed of composite plies, as unidirectional fiber tows or rovings, or in other configurations.

In any one of the composite parts disclosed herein, the composite plies 202 may be made up of a plurality of reinforcing fibers 206 surrounded by matrix material. The reinforcing fibers 206 may be high-modulus or high-strength fibers 206 formed of carbon, glass, or other fiber material. The fibers 206 in a composite ply may be continuous fibers 206 that may be commonly aligned or oriented in a single direction (e.g., unidirectional fibers) or the fibers 206 in a composite ply may be woven together in two or more directions in a fabric arrangement. In some examples, the composite plies 202 may be provided as pre-impregnated composite plies 202 wherein the reinforcing fibers 206 may be pre-impregnated with a polymeric matrix material (e.g., prepreg) such as thermosetting resin 204 (e.g., epoxy). Alternately, one more of the composite parts may be formed of dry fiber composite plies which may be assembling a stacked arrangement and infused with resin prior to curing in the desired shape.

In FIG. 4, the first and second composite parts 130, 132 made each include a flange 138 and a web 136 interconnected by a bend radius 140. Although shown as having an L-shaped cross-section (e.g., an L-section 134), the first and second composite parts 130, 132 may be provided in any one of a variety of cross-sectional shapes having a flange 138, a web 136, and a bend radius 140 interconnecting the flange 138 and web 136. Although shown as having a generally planar shape, the flange 138 and the web 136 of the first and/or second composite part 130, 132 may be provided in any shape such as in non-planar shapes or curved shapes. In addition, the flange 138 and/or the web 136 may have extensions (not shown). For example, the free end of the flange 138 and/or the web 136 of the first composite part 130 and/or second composite part 132 may include an upturned lip (not shown). The assembled first and second composite part 130, 132 may form a stringer having any one of a variety of cross-sectional shapes including a blade section 118 (FIG. 4), a C-section 120 (FIG. 32), an I-section 122 (FIG. 33), a hat section 124 (FIG. 34), or other shapes.

Figure 6:
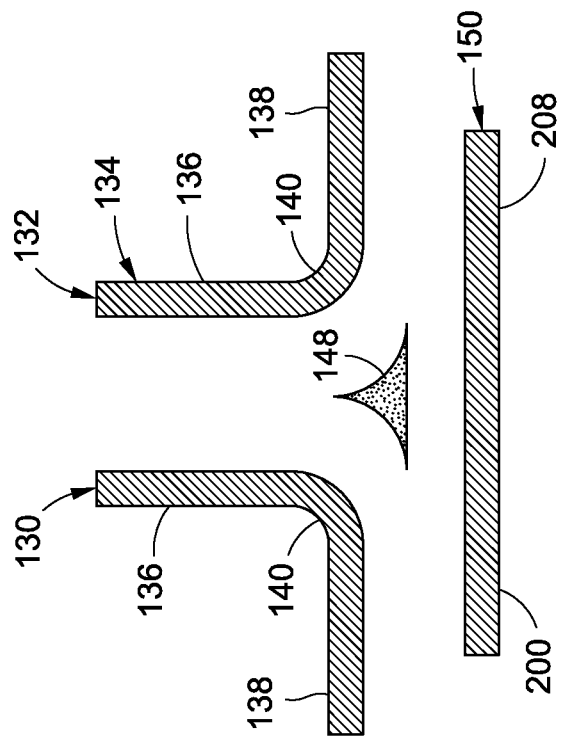
FIG. 6 is an exploded view on the first, second, and third composite parts and the radius filler that make up a conventional detail assembly.
Figure 5:
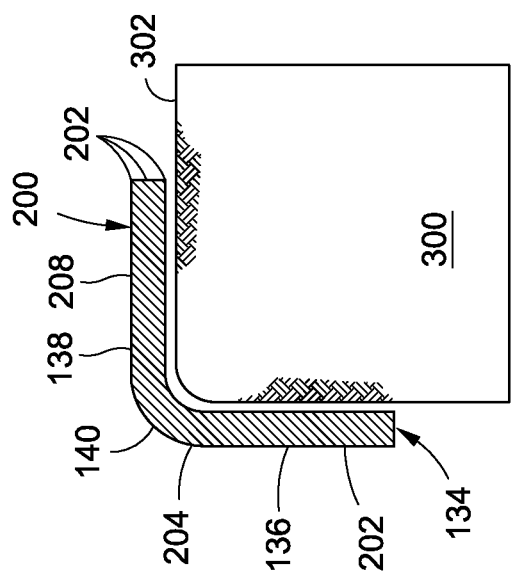
FIG. 5 is a side view of a first composite part laid up on a conventional layup tool.

FIG. 5 is a side view of a composite part (e.g., a first or second composite part 130, 132) during layup on a conventional layup tool 300. As indicated above, the composite part may be made up of a plurality of composite plies 202. In the example shown, the first composite part 130 (FIG. 6) is configured as an L-section 134 (e.g., an L-shaped cross-section) comprised of a flange 138 and a web 136 interconnected by a bend radius 140. FIG. 6 shows first, second, and third composite parts 130, 132, 150 and a radius filler 148 that may be assembled to form a conventional detail assembly 142 (FIG. 7) which may be cured and then co-bonded to an uncured fourth composite part 156 (e.g., FIG. 13) such as a skin panel 112 to form a conventional composite assembly 158 (FIG. 14).

Figure 7:
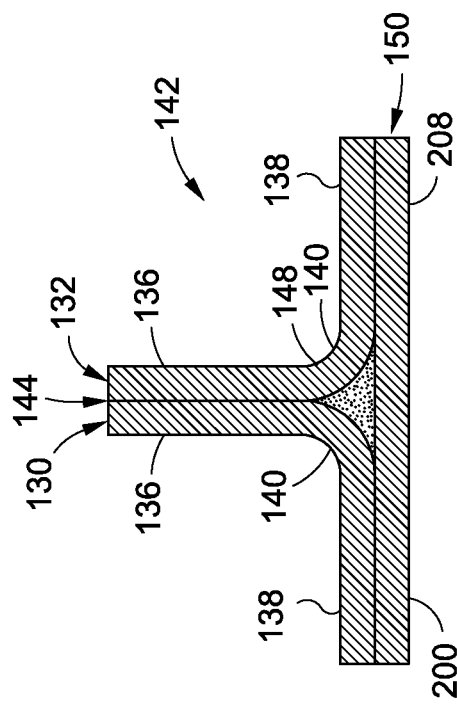
FIG. 7 shows the first, second, and third composite parts and the radius filler assembled to form the conventional detail assembly.

In FIG. 5, the conventional layup tool 300 has a tool surface 302 configured to form the first composite part 130 in a shape such that when the web 136 of the first composite part 130 is coupled back-to-back with the web 136 of the second composite part 132, the flanges 138 of the first and second composite part 130, 132 will be flush with a third composite part 150 (e.g., an uncured base laminate 152—FIG. 6). In the example shown, the conventional layup tool 300 for the first composite part 130 may form the flange 138 and web 136 at an enclosed angle 220 (see FIG. 9) of 90° relative to one another. The second composite part 132 may also be formed an enclosed angle 220 (FIG. 9) of 90° such that the flanges 138 of the assembled first and second composite part 130, 132 may be generally planar and flush with one another. FIG. 7 shows the uncured first, second, and third composite part 130, 132, 150 and a radius filler 148 assembled to form the conventional detail assembly 142 (FIG. 7).

FIG. 8 shows the curing of the conventional detail assembly 142 of FIG. 7 on a conventional cure tool 304. The conventional cure tool 304 may have a tool surface 306 with a contour matching the contour of the uncured fourth composite part 156 (e.g., an uncured skin panel) to which the cured detail assembly 142 is to be co-bonded. In this regard, the conventional cure tool 304 may establish the contour of the mating surface of the base laminate 152 to match the contour of the uncured or partially-cured fourth composite part 156 (e.g., a skin panel).

The detail assembly 142 may be cured using a vacuum bag assembly 400 for applying compaction pressure 410 the detail assembly 142. Heat 408 may be applied during the vacuum bagging process to reduce the viscosity of the resin 204 allowing the resin 204 of the individual composite parts to flow and intermingle at the mating surfaces between the composite parts. A bagging film 402 may be sealed along the perimeter edges using an edge sealant 404. The vacuum bag assembly 400 may include one or more layers not shown such as a breather layer to facilitate the uniform application of compaction pressure 410 to consolidate the composite laminate 208 against the tool surface 306 and to force out volatiles, gas, and moisture, and promote the uniform distribution of resin 204 within the detail assembly 142. The compaction pressure 410 may compact the composite plies 202 against the tool surface 306 to improve the fiber volume fraction and reduce or prevent the occurrence of voids in the cured detail assembly 142.

Additional layers may be included with the vacuum bag assembly 400 such as a release layer (not shown) to facilitate the removal of the vacuum bag assembly 400 from the cured detail assembly 142, and a release coat or film (not shown) which may be applied to the tool surface 306 prior to laying up the composite plies 202. Vacuum pressure may be applied to the bagging film 402 by a vacuum source 406 such as a vacuum pump (not shown) to apply compaction pressure 410 for consolidating the composite laminate 208. In some examples, higher levels of compaction pressure 410 may be applied by curing the detail assembly 142 in an autoclave. Although the composite laminate 208 is shown vacuum-bagged in FIG. 4, consolidation and/or curing may be performed using other means for applying compaction pressure 410 including, but not limited to, a mechanical press, a caul plate, or other compaction means.

As indicated above, conventional methods of forming integrally-stiffened composite assemblies result in undesirable residual stress and strain in the bend radii 140 and radius filler 148 of the composite parts that make up the composite assembly 158. Conventional methods of manufacturing composite assemblies unfortunately lock in the residual stress which has a detrimental effect on the load-carrying capability and durability of the composite assembly 158, as mentioned above. Such residual stress and strain is generated in the bend radii 140 and in the radius filler 148 as a result of the orthotropic nature of composite materials and the inability of the assembled composite parts to move during and after cure, as illustrated in FIGS. 9-11 and described below.

FIG. 9 is a sectional view of an uncured composite laminate 208 prior to curing. The composite laminate 208 is made up of prepreg composite plies 202 formed as an L-section 134 having a web 136 and flange 138 interconnected by a bend radius 140. The web 136 and the flange 138 define an enclosed angle 220 which, in the example shown, is approximately 90°.

FIG. 10 shows the composite laminate 208 of FIG. 9 after curing such which may involve the application of heat 408. As indicated above, heat 408 may be applied to initiate the cross-linking of the polymers in the resin 204 and may also reduce the viscosity of the resin 204 to promote the flow of the resin 204 in the composite parts. However, in some examples, a composite laminate 208 may be provided in a material system that allows for curing of the resin 204 without the application of heat 408.

FIG. 10 shows the cure shrinkage spring-in 228 that occurs in the composite laminate 208 due to resin shrinkage during cure of the composite laminate 208. The cure shrinkage may be characterized as chemical shrinkage or volumetric shrinkage of the resin 204 due to the cross-linking or polymerization of the thermosetting resin 204 during cure as the resin 204 transitions from a semi-liquid or liquid state to a solid state. In addition, a small portion of the resin 204 may be absorbed into the spaces or interstices between the tows and/or into the interstices between the filaments (not shown) that make up each fiber tow. Depending upon the maternal system, cure shrinkage of up to 10% may occur in a composite laminate during cure.

In FIG. 10, the reinforcing fibers 206 in a composite laminate 208 may limit volumetric shrinkage along an in-plane direction 224 (e.g., parallel to the fibers 206). However, volumetric shrinkage of the resin 204 in the through-thickness direction 222 (e.g., transverse to the fibers 206) may be unrestrained. The difference between the in-plane volumetric shrinkage 224 and the through-thickness volumetric shrinkage 222 results in cure shrinkage spring-in 228 of the composite laminate 208 and is represented by a reduction in the enclosed angle 220 between the flange 138 and the web 136 of the cured composite laminate of FIG. 10 relative to the enclosed angle 220 of the uncured composite laminate in FIG. 9.

FIG. 11 is a sectional view of the composite laminate 208 showing thermally-induced spring-in 256 that may occur in the composite laminate 208 during cool-down from cure temperature to room temperature (e.g., 68-72° F.) or other ambient temperature. Thermally-induced spring-in may result from a mismatch in the coefficient of thermal expansion (CTE) between the resin 204 and the reinforcing fibers 206. In this regard, the resin 204 may have a coefficient of thermal expansion (CTE) that may be greater than the CTE of the reinforcing fibers 206. For example, epoxy resin 204 may have a CTE that may be an order of magnitude or more higher than the CTE of carbon fiber. The difference in CTE may result in the resin 204 and fibers 206 contracting by different amounts as the composite laminate 208 cools down from cure temperature to room temperature.

Due to their in-plane orientation, the reinforcing fibers 206 dominate the in-plane contraction and thereby result in a relatively low in-plane CTE 252 of the composite laminate 208. Through-thickness contraction is dominated by the resin 204 and results in a relatively high through-thickness CTE 250 for the composite laminate 208. The difference in in-plane contraction vs. through-thickness contraction results in thermally-induced spring-in 256 of the composite laminate 208 during cool-down and is represented in FIG. 11 by a further decrease in the enclosed angle 220 between the flange 138 and web 136 of the composite laminate 208 in FIG. 11 relative to the enclosed angle 220 of the composite laminate 208 in FIG. 10.

Referring briefly to FIGS. 7-8, the detail assembly 142 includes the third composite part 150 (e.g., the base laminate 152) which may extends across and interconnect the flange 138 of the first composite part 130 to the flange 138 of the second composite part 132 and encapsulate the radius filler 148. During cure, the third composite part 150 (e.g., the base laminate 152) solidifies and stiffens along with the first and second composite parts 130, 132 and the radius filler 148. The stiffened base laminate 152 thereby prevents spring-in of the flanges 138 of the first and second composite part 130, 132, resulting in cure shrinkage residual stress 226 and thermally-induced residual stress 254 in the bend radius 140 of the cured first and second composite parts 130, 132 and in the radius filler 148 of the cured composite assembly 158. The residual stress may result in undesirable microcracking in the bend radii 140 and radius filler 148 during cure (e.g., due to cure shrinkage) and after cure during cool-down (e.g., due to thermally-induced due to CTE mismatch). Thermally-induced residual stress may also occur during the service life of the composite structure due to changes in the temperature (e.g., thermal cycling) of the detail assembly 142 as a result of changes in the temperature of the operating environment. In the case of an aircraft 100 (FIG. 1), changes in the temperature of the operating environment may occur with changes in altitude.

In an example of an L-section 134 composite laminate 208 formed at an enclosed angle 220 of 90°, a cured composite laminate 208 may spring-in a total of approximately 1.9° after cure and cool-down. However, when heated back up to the cure temperature, the composite limit may only spring-out approximately 1.3° due to the irreversible nature of the cure shrinkage spring-in 228 and the reversible nature of the thermally-induced spring-in 256. In this regard, cure shrinkage is responsible for approximately 30% of the total spring-in behavior of a composite laminate 208. The amount of spring-in may be dependent upon a variety of parameters including, but not limited to, the material system of the resin and fibers, the composite laminate configuration including ply quantity and stacking sequence, and the curing parameters such as maximum cure temperature, dwell time at cure, and other parameters. Composite laminates of increased gauge, smaller bend radius, and/or relatively high cure temperatures may have higher amounts of spring-in than laminates of thinner gauge, larger bend radius, and lower cure temperatures.

Figure 12:
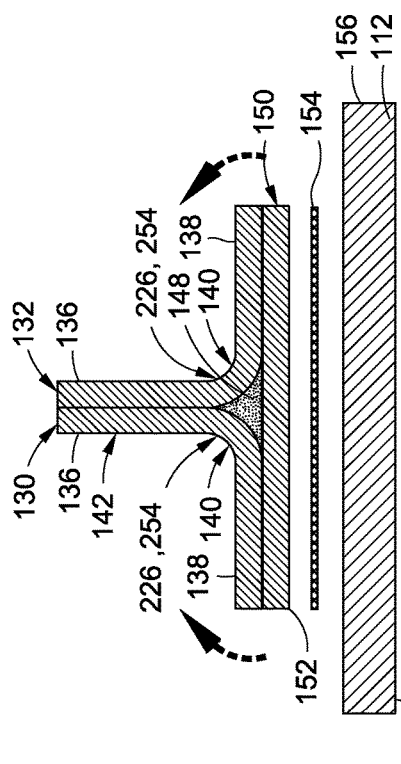
FIG. 12 is an exploded view of the assembly of a cured conventional detail assembly to an uncured composite part using an adhesive layer.

FIG. 12 is an exploded view of a cured conventional detail assembly 142 prior to assembly with an uncured third composite part 156 using an adhesive layer 154. In the detail assembly 142, the third composite part 150 (e.g., a base laminate 152) constrains movement of the flanges 138 of the first and second composite part 130, 132 against cure shrinkage spring-in 228 and against thermally-induced spring-in 256 as represented by the dashed curved arrows. As a result, residual stress is locked into the bend radii 140 and the radius filler 148 prior to co-bonding the detail assembly 142 to an uncured fourth composite part 156 which may be a skin panel 112 or other composite structure.

Figure 13:
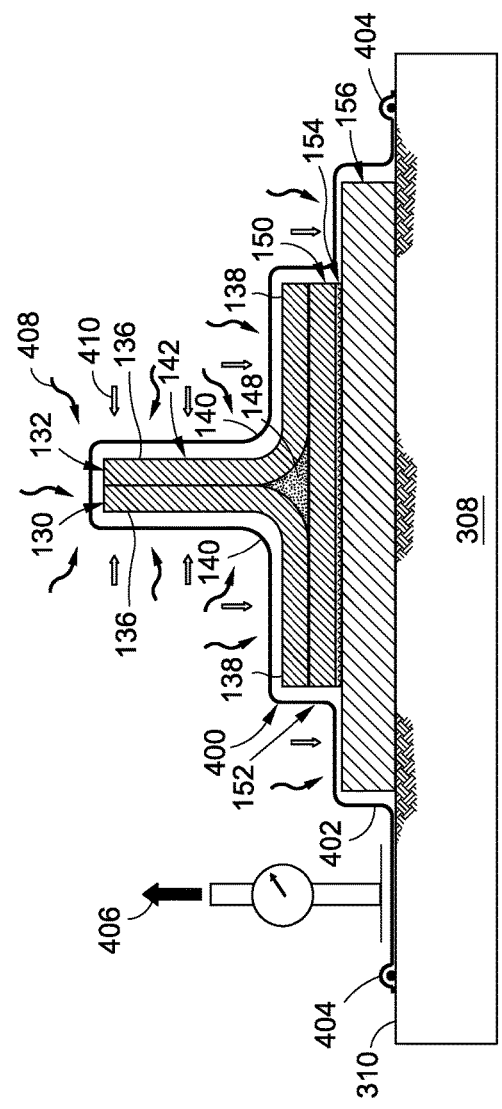
FIG. 13 is a side view of the cured conventional detail assembly of FIG. 8 during co-bonding to the uncured composite part on an assembly cure tool to form a cured conventional composite assembly.
Figure 14:
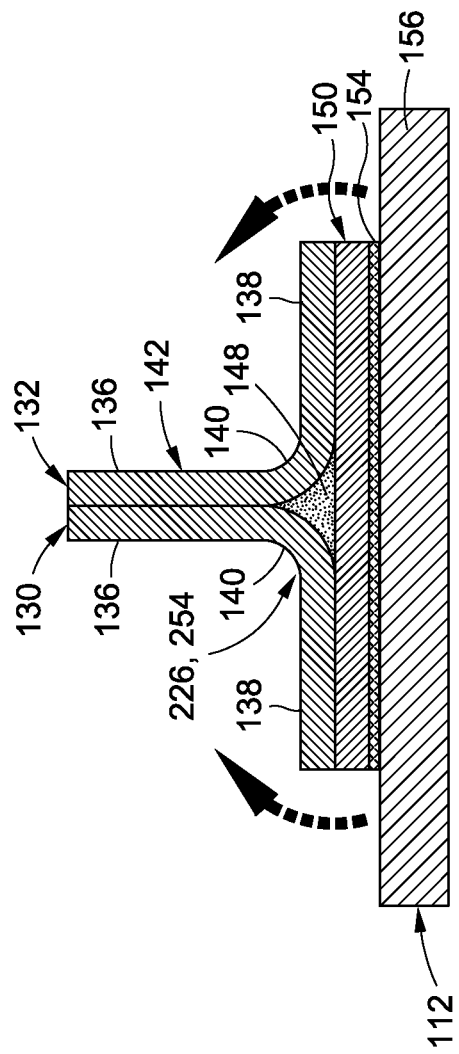

FIG. 13 is a side view of the cured conventional detail assembly 142 during co-bonding to the uncured fourth composite part 156 on an assembly cure tool 308. Heat 408 and compaction pressure 410 may be applied to the composite assembly 158 by vacuum bagging with the optional assistance of autoclave pressure. As indicated above, the fourth composite part 156 (e.g., the base laminate 152) may be cured during the bonding of the detail assembly 142 to the fourth composite part 156 along the adhesive layer 154.

FIG. 14 shows the cured conventional composite assembly 158 retaining the residual stress in the bend radii 140 and in the radius filler 148. As indicated above, during curing of the detail assembly 142, the third composite part 150 constrains the first and second composite part 130, 132 against cure shrinkage spring-in 228. After cure and during cool-down from cure temperature to room temperature, the third composite part 150 also constrains the first and second composite part 130, 132 against thermally-induced spring-in 256.

Figure 15:
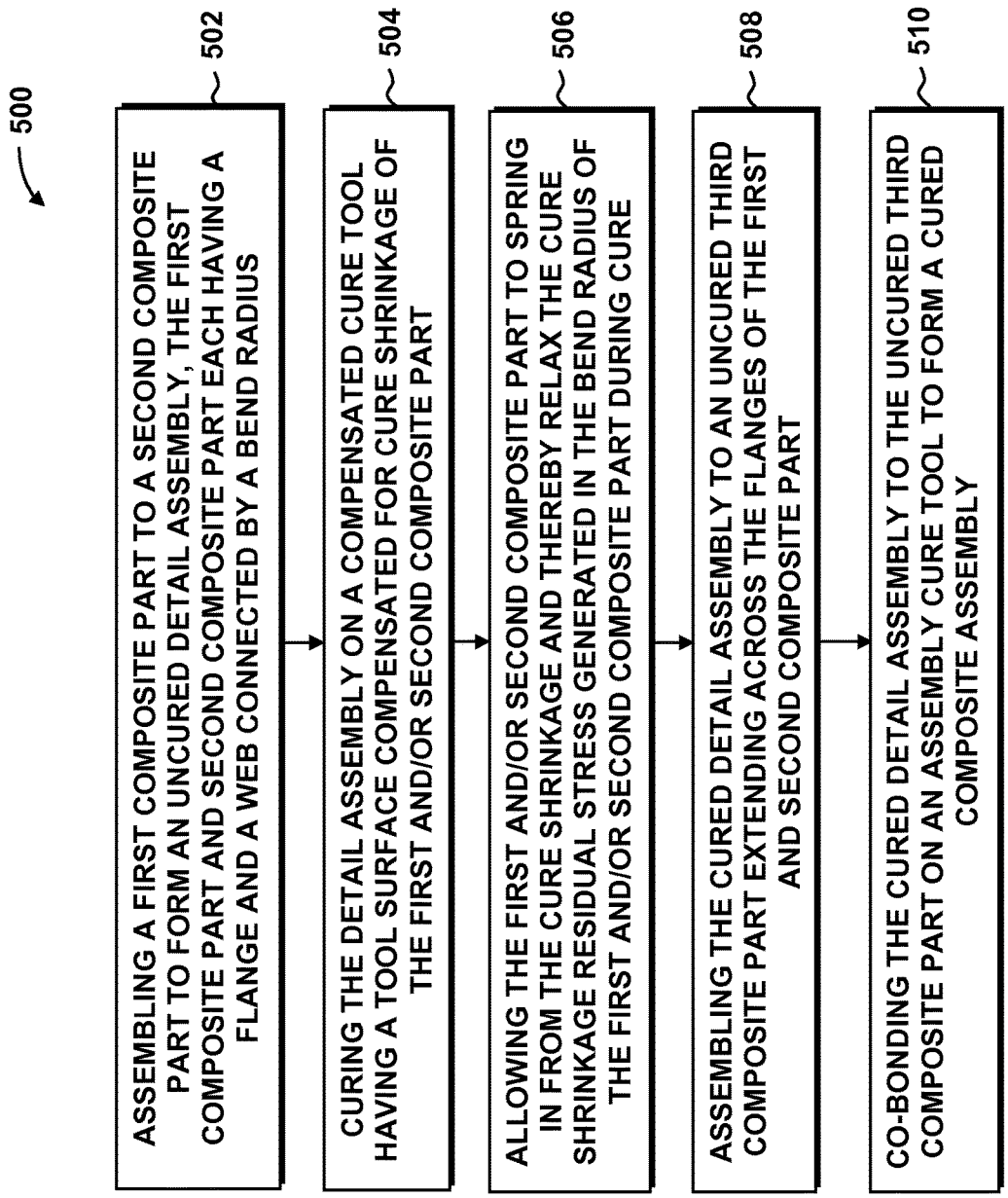
FIG. 15 is a flowchart having one or more operations that may be included in a method of forming a composite assembly with reduced residual stress.

FIG. 15 is a flowchart having one or more operations that may be included in a method 500 of reducing residual stress in a composite assembly 158. In one example, disclosed is a method of manufacturing an integrally-stiffened skin panel assembly 160 with reduced, negligible, or non-existent residual stress in the bend radii 140 and/or in the radius filler 148 of one or more composite parts that make up the composite assembly 158. In some examples, the disclosed methods allow for the relaxation of the cure shrinkage component of residual stress. In other examples, the disclose methods allow for the relaxation of a combination of cure shrinkage residual stress 226 and thermally-induced residual stress 254.

Referring to FIG. 16, the method may include laying up composite plies 202 to form an uncured first composite part 130 and an uncured second composite part 132. In one example, the composite plies 202 may be laid up on a compensated layup tool 312 having a tool surface 314 with a contour matching the contour of the tool surface 318 of a compensated cure tool 316 (FIG. 19) which may be compensated for cure shrinkage spring-in 228 (FIG. 19). For example, the compensated layup tool 312 illustrated in FIG. 16 may include a tool surface 314 oriented at a cure shrinkage spring-in angle $\theta_{CS}$ relative to the contour of the tool surface 302 of a conventional or non-compensated layup tool 300 shown in FIG. 5. However, for a first composite part 130 and a second composite part 132 having a relatively small predicted cure shrinkage spring-in angle $\theta_{CS}$, the first composite part 130 and a second composite part 132 may also be laid up on a non-compensated, conventional layup tool 300 (FIG. 5).

Referring to FIG. 17, Step 502 of the method 500 may include assembling a first composite part 130 to a second composite part 132 to form an uncured detail assembly 142. The method may further include installing a radius filler 148 within a lengthwise notch 146 (see FIG. 4) formed between the back-to-back bend radii 140 of the first composite part 130 and second composite part 132 when assembled. The radius filler 148 may be formed of composite materials such as composite plies, unidirectional fiber roving, or any one of a variety of other composite materials or combinations of materials. As indicated above, the first composite part 130 and/or the second composite part 132 may be configured as a composite layup 200 formed of composite plies 202 which may be laid up on a compensated layup tool 312 having a tool surface 314 contour matching the tool surface 318 contour of a compensated cure tool 316.

In the example shown, the first composite part 130 and second composite part 132 each have at least one flange 138 and at least one web 136. The flange 138 and web 136 are interconnected by a bend radius 140. The flange 138 and the web 136 are each shown as having a planar configuration but may have other configurations including a curved configuration or a combination of one or more planar portions (not shown) and one or more curved portions (not shown), as mentioned above. In FIG. 17, the first composite part 130 and second composite part 132 are each configured as an L-section 134 forming an enclosed angle 220 between the flange 138 and web 136. The first composite part 130 and second composite part 132 may be formed at any enclosed angle 220 relative to one another, and are not limited to the enclosed angle 220 shown in FIG. 18.

FIG. 18 shows an uncured detail assembly 142 comprising the radius filler 148 and the first and second composite part 130, 132 of FIG. 17. The first composite part 130 and second composite part 132 may be assembled such that the webs 136 are arranged in back-to-back contact along a detail interface 144. The radius filler 148 may be sized and configured to fit within the notch 146 between the bend radii 140.

The detail assembly 142 may be configured as a stringer 114 have a relatively long length with a correspondingly large length-to-height aspect ratio. For example, the detail assembly 142 may be configured as a stringer 114 for extending along a lengthwise direction of a relatively long skin panel of an aerodynamic surface such as a wing skin panel 112, a fuselage skin panel, or a skin panel of a horizontal or vertical tail 108 of an aircraft. In this regard, the stringer 114 may have a length-to-height aspect ratio of greater than 1 such as an aspect ratio of 10 or more. Alternatively, the detail assembly 142 may have a relatively short length-to-height aspect ratio of less than 10. In this regard, the detail assembly 142 may be configured as relatively small clip or bracket (not shown) such as may be implemented for supporting a system component such as bracket or clip for supporting electrical wiring or a fluid conduit.

Referring to FIG. 19, Step 504 of the method 500 of FIG. 15 may include curing the detail assembly 142 on a compensated cure tool 316 with the flanges 138 of the first composite part 130 and second composite part 132 supported on (e.g., placed in contact with) a tool surface 318. Advantageously, the detail assembly 142 may omit a third composite part 150 conventionally included in the curing of convention detail assemblies (see FIG. 8) and which extends from the flange 138 of a first composite part 130 across the radius to the flange 138 of the second composite part 132 such that the third composite part 150 would constrain the first composite part 130 and/or second composite part 132 against spring-in if co-cured with the first and second composite part 130, 132.

In FIG. 19, the tool surfaces 318 of the compensated cure tool 316 may advantageously have a contour compensated for cure shrinkage spring-in 228 of a magnitude predicted to occur in the first composite part 130 and/or the second composite part 132 during the curing of the detail assembly 142. In this regard, the compensated cure tool 316 may have a contour for supporting the flanges 138 of the first composite part 130 and second composite part 132. The contour may be oriented at a cure shrinkage spring-in angle $\theta_{CS}$ on each side of the compensated cure tool 316 relative to a conventional cure tool 304 (e.g., see FIG. 8) which may be non-compensated for cure shrinkage.

Cure shrinkage spring-in (e.g., the spring-in angle) may be based on the geometry of the detail assembly 142 including the initial enclosed angle 220 of the first composite part 130 and second composite part 132 prior to cure, the individual composite ply thicknesses, the overall thickness of the first composite part 130 and second composite part, the ply stacking sequence, the location of ply-drops and ply adds along the length of the detail assembly 142, and the material systems of the fibers 206 and resin 204 in the first composite part 130, the second composite part 132, and in the radius filler 148. In addition, cure shrinkage may be based on the processing parameters during curing of the detail assembly 142 including the cure temperature-pressure-time profile and the degree of cure of the detail assembly 142, as mentioned above.

Spring-in of the first composite part 130 and second composite part 132 may be predicted using analysis (e.g., computer simulation), empirical testing (e.g., laboratory testing), and/or observation of similar curing processes in a production environment. The cure shrinkage spring-in 228 of the first composite part 130 may be different than the cure shrinkage spring-in 228 of the second composite part 132 due to different enclosed angles 220 in the first composite part 130 and second composite part 132 and/or due to different laminate thicknesses and other geometry differences between the first composite part 130 and second composite part 132.

In FIG. 19, the method may include applying a vacuum bag assembly 400 over the detail assembly 142 which may be mounted to the compensated cure tool 316. A bagging film 402 may applied over the detail assembly 142 and sealed to the tool surfaces 318 using edge sealant 404. Vacuum pressure applied to the bagging film 402 may result in the application of compaction pressure 410 (e.g., atmospheric pressure and autoclave pressure) onto the detail assembly 142 to consolidate the detail assembly 142 and conform the flanges 138 of the first composite part 130 and second composite part 132 to the tool surfaces 318. Heat 408 may be applied to elevate the temperature of the uncured detail assembly 142 to a cure temperature for a predetermined time period according to a predetermined heat-pressure profile until the detail assembly 142 is cured.

The curing of the detail assembly 142 may cure and bond together the webs 136 of the first composite part 130 and second composite part 132. In addition, the curing of the detail assembly 142 may cure and bond the bend radii 140 of the first composite part 130 and second composite part 132 to the radius filler 148. Advantageously, the absence of a third composite part 150 in the detail assembly 142 constraining the flanges 138 of the first composite part 130 and second composite part 132 against movement may avoid the generation of cure shrinkage residual stress 226 in the bend radii 140 and in the radius filler 148 during cure.

Referring to FIG. 20, step 506 of the method may include removing the vacuum bag assembly 400 and allowing cure shrinkage spring-in 228 and thermally-induced spring-in 256 of the flanges 138 of the first composite part 130 and second composite part 132 in an unconstrained manner, as represented by the curved arrows in FIG. 20. As indicated above, the flanges 138 may spring in due to the absence of a third composite part 150 which may be co-cured with the detail assembly 142 in a conventional process (e.g., FIG. 8), as described above. The ability of the flanges 138 to spring-in allows for the relaxation of cure shrinkage residual stress 226 and thermally-induced residual stress 254 that would otherwise be retained within the bend radius 140 of the first composite part 130 and second composite part 132 and in the radius filler 148.

Figure 21:
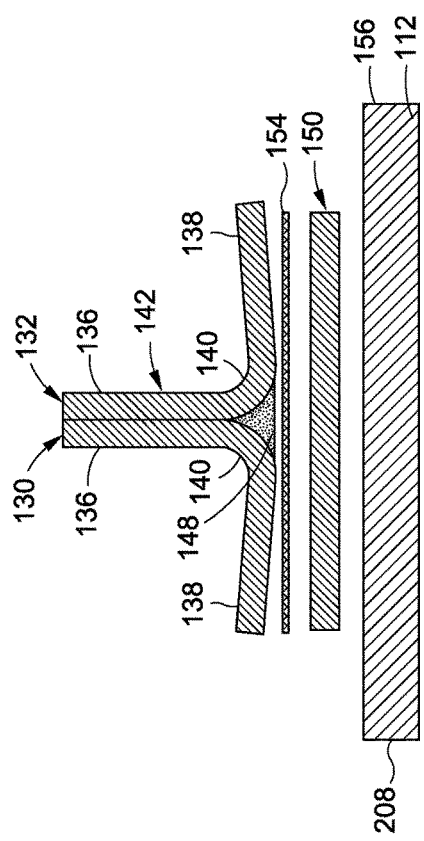
FIG. 21 is an exploded view of the cured detail assembly of FIG. 20 prior to assembly with an uncured third composite part (e.g., a base laminate) and an uncured fourth composite part (e.g., a skin panel)

Referring to FIG. 21, step 508 of the method may include assembling the cured detail assembly 142 to a third composite part 150 which may be formed as one or more uncured composite layups 200. For example, the third composite part 150 may be configured as two or more uncured composite parts stacked on top of one another. In one example, the uncured third composite part 150 may comprise an uncured base laminate 152 stacked on top of an uncured skin panel 112. The base laminate 152 and the skin panel 112 may comprise a skin assembly. In the example shown, the third composite part 150 has a generally planar shape configured complementary to the shape of the fourth composite part 156 or the contour of the tool surface 310 of the assembly cure tool 308. The uncured third composite part 150 is shown having a planar shape and extending across the flanges 138 of the first composite part 130 and second composite part 132 and may be in contact with the radius filler 148 and the flanges 138 of the first composite part 130 and second composite part 132.

FIG. 21 shows the cured detail assembly 142 at room temperature with the uncured third composite part 150 (e.g., base laminate 152) and the uncured fourth composite part 156 (e.g., skin panel). At room temperature, the radius filler 148 and the bend radii 140 of the first composite part 130 and second composite part 132 may be in a generally stress-free state. An adhesive layer 154 may be installed between the base laminate 152 and the detail assembly 142. The adhesive layer 154 may be positioned between the mating surfaces of the flanges 138 and the mating surfaces of the base laminate 152. The adhesive layer 154 may extend from the free end of the flange 138 of the first composite part 130, across the radius filler 148, to the free end of the flange 138 of the second composite part 132. In one example, the adhesive layer 154 may be epoxy although the adhesive layer 154 may be provided in other material compositions for bonding the detail assembly 142 to the third composite part 150. At room temperature when the detail assembly 142, the adhesive layer 154, and the base laminate 152 are assembled, a gap may exist between each flange 138 and the adhesive layer 154 due to the non-parallel relation between the flanges 138 and the third composite part as a result of spring-in. The gap may be relatively small and the application of vacuum pressure may close the gap because the flanges 138 are not constrained. The unconstrained flanges 138 have an added advantage in that the flanges 138 may better conform to the curvature of the mating surfaces.

Figure 22:
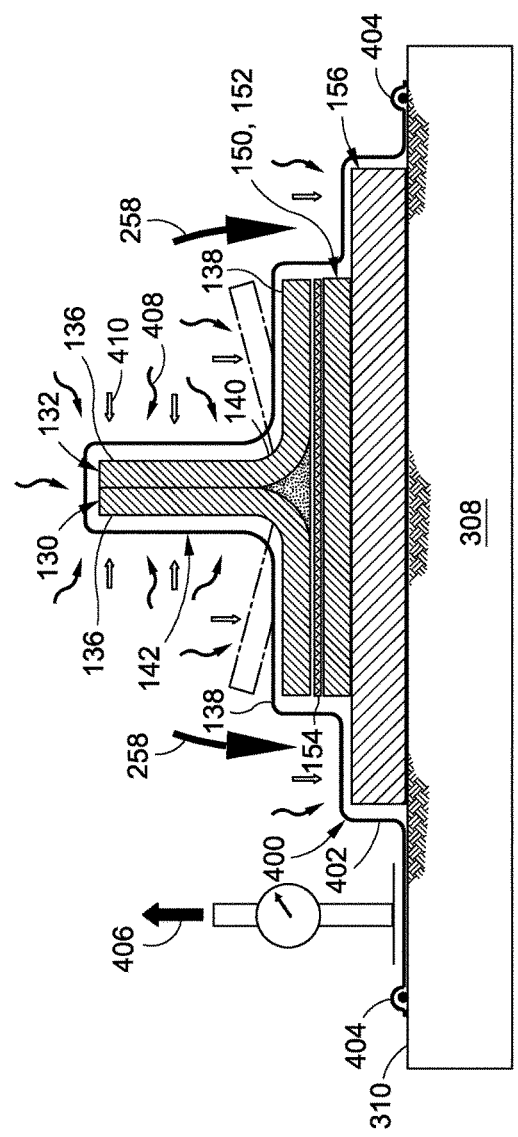
FIG. 22 is a side view of the cured detail assembly during co-bonding to the un-cured third and fourth composite parts on an assembly cure tool.

Referring to FIG. 22, step 510 of the method may include co-bonding the cured detail assembly 142 to the third composite part 150. In some examples, the method may include laying up or positioning the third composite part 150 on an assembly cure tool 308, and mating the detail assembly 142 to the third composite part 150. The cured detail assembly 142 may be co-bonded to the third composite part 150 to form a composite assembly 158 with reduced or non-existent cure shrinkage residual stress 226 in the radius filler 148 and the bend radii 140 of the first composite part 130 and second composite part 132. FIG. 22, shows the cured detail assembly 142, the adhesive layer 154, and the un-cured third and fourth composite parts 150, 156 assembled on the assembly cure tool 308 with a vacuum bag assembly 400 applied during co-bond of the detail assembly 142 to the third and fourth composite parts 150, 156.

The composite assembly 158 is shown heated to a cure temperature which results in thermally-induced spring-out 258 of the flanges 138 of the first and second composite part 130, 132 due to the reversible nature of the thermally-induced spring-in 256. In some example, the compensated cure tool 316 (FIG. 19) may be compensated for cure shrinkage spring-in 228 by an amount such that in the cured detail assembly 142, the flanges 138 of the cured detail assembly 142 spring out and are flush with the third composite part 150 at cure temperature during co-bonding of the detail assembly 142 to the third composite part 150. In an example not shown, the cured detail assembly 142, the adhesive layer 154, and the uncured third composite part 150 may be assembled without an assembly cure tool 308. For example, the composite assembly 158 may be encapsulated in a vacuum bag (not shown) and compaction pressure 410 and heat 408 may be applied to cure the third composite part 150 while simultaneously bonding the detail assembly 142 to the third composite part 150 along the adhesive layer 154.

FIG. 22 illustrates an example wherein the compensation of cure shrinkage spring-in 228 only (e.g., and not thermally-induced spring-in 256) may be such that the flanges 138 are at an engineering nominal position at cure temperature during co-bond. Vacuum pressure and/or autoclave pressure on the bagging film 402 may generate compaction pressure 410 on the composite assembly 158 for removing voids and/or air pockets in the adhesive layer 154, and consolidating the un-cured third and fourth composite parts 150, 156. Advantageously, a flush orientation of the flanges 138 with the third composite part 150 (e.g., no gaps) at cure temperature may reduce or avoid the formation of wrinkles or bow waves (not shown) in the upper composite plies of the fourth composite part 156 at locations adjacent to the free edges of the third composite part 150, as may occur in conventional composite assemblies.

Figure 23:
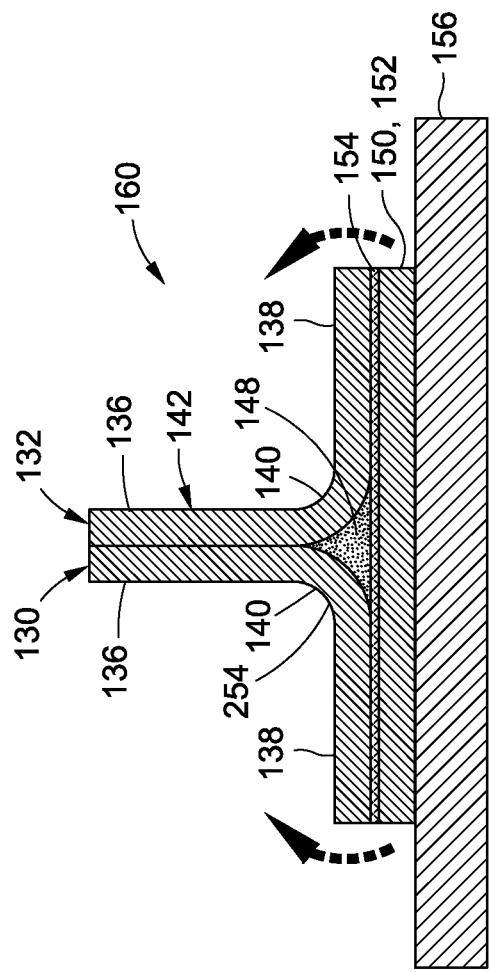

FIG. 23 is a side view of the cured composite assembly 158 of FIG. 22 having reduced residual stress in the bend radii 140 and radius filler 148 due to the absence of cure shrinkage spring-in 228. The base laminate 152 (e.g., the third composite part 150) constrains the flanges 138 of the first composite part 130 and second composite part 132 against thermally-induced spring-in 256 during cool down after co-bonding. The dashed curved arrows in FIG. 23 represent the tendency of thermally-induced spring-in 256 of the flanges 138 which manifests as residual stress in the bend radii 140 and radius filler 148 of the detail assembly. However, the detail assembly may have reduced or non-existent cure shrinkage residual stress 226 in the band radii and in the radius filler 148.

FIG. 24 shows an example of a composite part laid up on a compensated layup tool 312 compensated for both cure shrinkage spring-in 228 and thermally-induced spring-in 256 of the flanges 138. In this regard, the compensated layup tool 312 may include a tool surface 314 oriented at a combination cure shrinkage spring-in angle $\theta_{CS}$ and thermally-induced spring-in 256 angle $\theta_{CTE}$ (e.g., additive $\theta_C$ and $\theta_{CTE}$) relative to the tool surface of a conventional or non-compensated or conventional layup tool 300 as shown in FIG. 5. The first composite part 130 and/or the second composite part 132 may be laid up on the compensated cure tool 316 of FIG. 24. However, the first composite part 130 and/or the second part may instead be laid up on a non-compensated cure tool 304 as shown in FIG. 5.

FIG. 25 is an exploded view of a radius filler 148 and the uncured first and second composite part 130, 132 prior to assembly. The first and second composite parts 130, 132 and the radius filler 148 may be assembled in a manner similar to the detail assembly 142 of FIG. 17 as described above in Step 502.

FIG. 26 shows the uncured detail assembly 142 comprising the radius filler 148 and the first and second composite parts 130, 132 of FIG. 25. The webs 136 may be placed in back-to-back contact. The radius filler 148 may be installed in the notch 146 (see FIG. 4) between the opposing bend radii 140 of the first composite part 130 and second composite part 132.

FIG. 27 shows the uncured detail assembly 142 of FIG. 26 mounted on a compensated cure tool 316 having a tool surface 318 compensated for both cure shrinkage spring-in 228 and thermally-induced spring-in 256. In this regard, the tool surface 318 of the cure tool 316 may be oriented at a combination cure shrinkage spring-in angle $\theta_{CS}$ and thermally-induced spring-in 256 angle $\theta_{CTE}$ (e.g., additive $\theta_C$ and $\theta_{CTE}$). The detail assembly 142 may be cured according to Step 504 described above wherein the flanges 138 of the first composite part 130 and second composite part 132 may be supported on a tool surface 318 having a contour compensated for cure shrinkage spring-in 228 predicted to occur in the first composite part 130 and second composite part 132 during cure of the detail assembly 142 and also compensated for thermally-induced spring-in 256 predicted to occur during cool-down of the detail assembly 142 after cure. Heat 408 and compaction pressure 410 may be applied to the detail assembly 142 using a vacuum bag assembly 400.

FIG. 28 shows the cured detail assembly 142 of FIG. 27 removed from the compensated cure tool 316. The curved arrows show the spring-in of the flanges 138 of the first and second composite part 130, 132. In this regard, the method may include allowing cure shrinkage spring-in 228 and thermally-induced spring-in 256 of the flanges 138 of the first composite part 130 and second composite part 132 to at least partially relax (e.g., remove) the cure shrinkage residual stress 226 and thermally-induced residual stress 254 in the bend radius 140 of the first composite part 130 and second composite part 132 and in the radius filler 148, in a manner similar to the above-described step 506. The compensated cure tool 316 may be compensated such that the tool surfaces 318 supporting the flanges 138 are oriented such that after cure when the detail assembly 142 is removed from the compensated cure tool 316, the cure shrinkage spring-in 228 occurring during cure and the thermally-induced spring-in 256 occurring during cool-down results in the flanges 138 being oriented complementary (e.g., flush) to the contour (e.g., planar) of the third composite part 150 when the detail assembly 142 is at room temperature.

Figure 29:
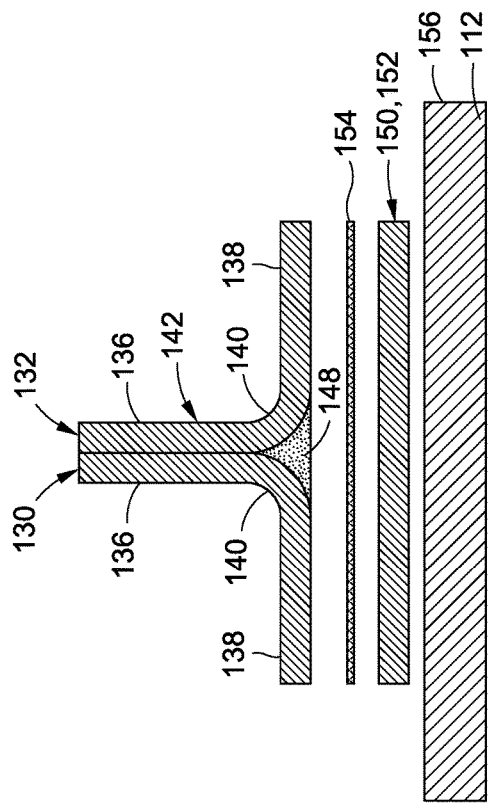
FIG. 29 is an exploded view of the cured detail assembly of FIG. 28 for assembly with an uncured third composite part and an uncured fourth uncured composite part.

FIG. 29 is an exploded view of the cured detail assembly 142 of FIG. 28 at room temperature prior to assembly with an uncured third composite part 150 (e.g., a base laminate 152) and uncured fourth uncured composite part (e.g., a skin panel 112) according to Step 508 described above. In this regard, the method may include assembling the cured detail assembly 142 to a third composite part 150 (e.g., an uncured composite layup) which may extend across the flanges 138 of the first composite part 130 and second composite part 132 with an adhesive layer 154 installed between the cured detail assembly 142 and the uncured third composite part 150. In some examples, the method may include laying up an uncured skin panel 112 (e.g., the fourth composite part 156) and an uncured base laminate 152 (e.g., the third composite part 150) on an assembly cure tool 308 prior to co-bonding the uncured detail assembly 142 to the uncured skin panel 112 and uncured base laminate 152.

The method may include assembling the cured detail assembly 142 to the uncured base laminate 152 and uncured skin panel 112, and curing the skin panel 112 and the base laminate 152 while bonding the detail assembly 142 to the base laminate 152 using the adhesive layer 154 between the detail assembly 142 and the base laminate 152. In some examples, the skin panel 112 may be the skin panel of an aerodynamic structure such as an aircraft wing 110 (FIG. 1), a fuselage 102, a horizontal tail 106, a vertical tail 108, or any one of a variety of composite structures. Such composite structures may also include non-aerodynamic structures such as internal load-carrying structures that may not be directly exposed to aerodynamic flow.

In FIG. 29, the detail assembly 142 is at room temperature such that when the detail assembly 142 is assembled with the third composite part 150, the flanges 138 will be flush or parallel with the third composite part 150 and no gaps may exist between the mating surfaces (e.g., abutting) surfaces of the third composite part 150 and the mating surfaces of the flanges 138. The compensated cure tool 316 may be compensated such that the tool surfaces 318 supporting the flanges 138 are oriented such that after cure when the detail assembly 142 is removed from the compensated cure tool 316, the cure shrinkage spring-in 228 during cure and the thermally-induced spring-in 256 during cool-down results in the flanges 138 being oriented complementary to the contour (e.g., planar) of the third composite part 150 to which the detail assembly 142 is to be co-bonded such that no gaps exist between the mating surfaces (e.g., abutting) surfaces of the third composite part 150 and the flanges 138.

Figure 30:
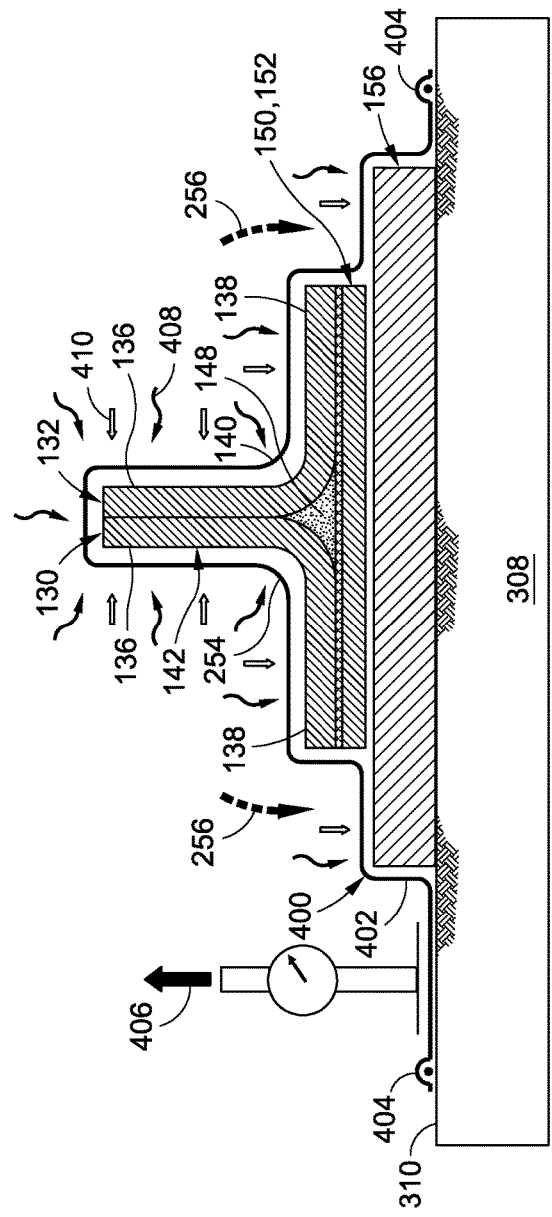
FIG. 30 is a side view of the cured detail assembly during co-bonding to the un-cured third and fourth composite parts on an assembly cure tool.

FIG. 30 shows the cured detail assembly 142 during co-bonding to the un-cured third and fourth composite parts 150, 156 according to be above-described step 510 of the method 500. In this regard, the method may include co-bonding the cured detail assembly 142 to the third composite part 150 on an assembly cure tool 308 (e.g., non-compensated tool) to form a composite assembly 158 (e.g., integrally-stiffened panel assembly 160) with reduced or non-existent cure shrinkage residual stress 226 and thermally-induced residual stress 254 in the radius filler 148 and the bend radii 140 of the first composite part 130 and second composite part 132. The third composite part 150 may comprise an uncured base laminate 152 and an uncured skin panel 112 positioned on an assembly cure tool 308 with an adhesive layer 154 installed between the cured detail assembly 142 and the uncured third composite part 150.

The compensated cure tool 316 (FIG. 27) may be compensated for cure shrinkage spring-in 228 and thermally-induced spring-in 256 by an amount such that the flanges 138 of the cured detail assembly 142 are flush with the third composite part 150 when the detail assembly 142 is at room temperature prior to co-bonding to the third composite part 150. As indicated above, the tool surfaces 318 of the compensated cure tool 316 may be oriented at an angle equal to the combination of the cure shrinkage spring-in angle $\theta_{CS}$ and the thermally induced spring-in angle $\theta_{CTE}$. The orientation of the tool surfaces 318 of the compensated cure tool 316 is relative to the orientation of the tool surfaces 306 of a non-compensated cure tool 304 (FIG. 8).

The dashed arrows in FIG. 30 represent the tendency for thermally-induced spring-out 258 of the flanges 138 as the detail assembly 142 heats up from room temperature to cure temperature. The flanges 138 may be restrained from springing out due to compaction pressure 410 and/or due to the stiffness of the fibers 206 (e.g., the fiber bed) of the third and/or fourth composite part 150, 156. In some examples, the compaction pressure 410 applied by the detail assembly 142 onto the third or fourth composite part 156 may be stored as elastic load in the bend radii 140 of the flanges 138. The amount of elastic load stored in the bend radii 140 due to the constrained flanges 138 on heat-up to the cure temperature may be equivalent to the amount by which the residual stress is reduced after cool-down to room temperature after co-bond.

FIG. 31 shows the cured composite assembly 158 of FIG. 30. As indicated above, the composite assembly 158 may have reduced or non-existent residual stress in the bend radii 140 and/or radius filler 148 due to the absence of cure shrinkage spring-in 228 and thermally-induced spring-in 256 of the flanges 138 of the first and second composite part 130, 132. The composite assembly 158 may be configured as an integrally-stiffened panel assembly 160 having one or more blade stringers 116.

Figure 33:
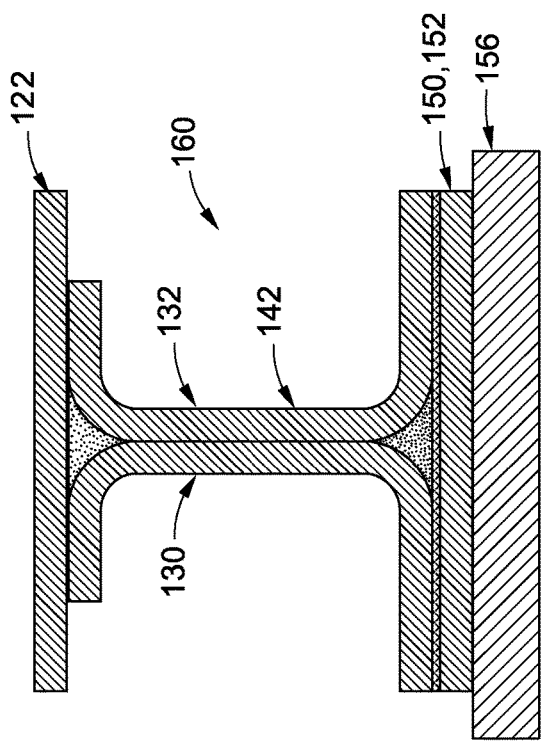
FIG. 33 is a side view of an example of an integrally-stiffened panel assembly having an I-section stringer and which may be manufactured using the methods disclosed herein.
Figure 34:
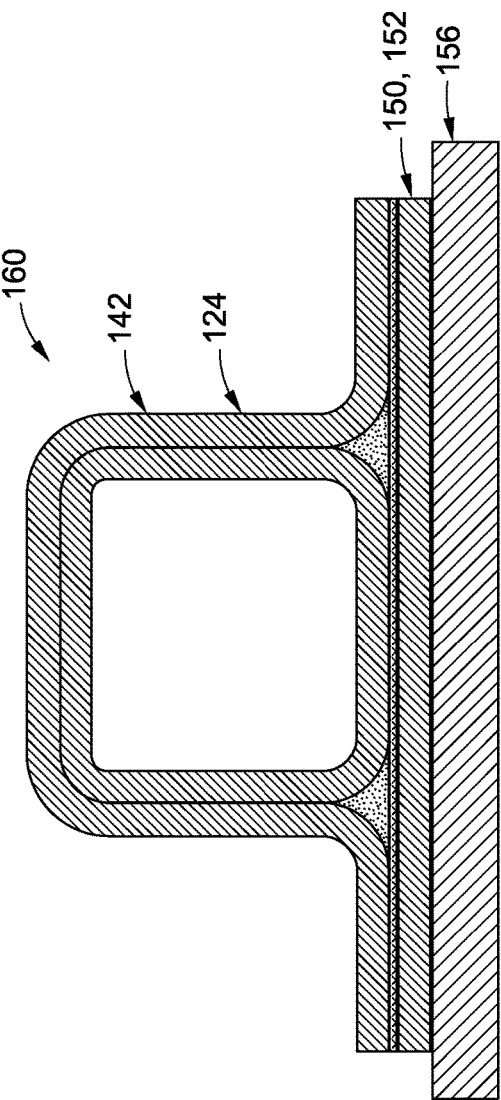
FIG. 34 is a side view of an example of an integrally-stiffened panel assembly having a hat-section stringer and which may be manufactured using the methods disclosed herein.

FIG. 32 shows an example of an integrally-stiffened panel assembly 160 having a stringer 114 with a C-section 120 and which may be manufactured using one or more of the methods disclosed herein. FIG. 33 shows an example of an integrally-stiffened panel assembly 160 having an I-section 122 stringer. FIG. 34 shows an example of an integrally-stiffened panel assembly 160 having a hat-section stringer. As may be appreciated, the disclosed methods may be implemented for manufacturing integrally-stiffened panel assemblies having any one of a variety of cross-sectional shapes.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A method of reducing cure shrinkage residual stress in a composite assembly, comprising:
    assembling a first composite part to a second composite part to form a detail assembly, the first and second composite part each having a flange and a web connected by a bend radius, the web of the first and second composite part being back-to-back;
    curing the detail assembly on a compensated cure tool compensated for cure shrinkage spring-in predicted to occur in the first and second composite part, the cure tool being non-compensated for thermally-induced spring-in predicted to occur in the first and second composite part during curing;
    allowing the first and second composite part of the detail assembly to spring in from the cure shrinkage;
    assembling the cured detail assembly to a third composite part that is uncured, the third composite interconnecting the flange of the first and second composite part;
    co-bonding the detail assembly to the third composite part to form a composite assembly having reduced cure shrinkage residual stress in the bend radii of the first and second composite part; and
    the compensated cure tool configured such that:
        a gap exists between the cured detail assembly and the third composite part due to thermally-induced spring-in when the cured detail assembly and the third composite are assembled and at room temperature prior to co-bonding;
        the detail assembly is flush with the third composite part due to thermally-induced spring-out when the cured detail assembly and the third composite are assembled and at cure temperature during co-bonding; and
        the detail assembly having thermally-induced residual stress at room temperature and after co-bonding.

2. The method of claim 1, wherein:
    the uncured third composite part extends from a flange of the first composite part to the flange of the second composite part.

3. The method of claim 1, wherein:
    the uncured third composite part comprises two or more uncured composite parts.

4. The method of claim 3, wherein:
    the uncured third composite part comprises an uncured base laminate stacked on top of an uncured skin panel.

5. The method of claim 4, wherein the step of assembling the cured detail assembly to the third composite part comprises:

laying up the third composite part on an assembly cure tool; and mating the detail assembly to the third composite part.

6. The method of claim 4, wherein the step of assembling the cured detail assembly to the third composite part comprises:

installing an adhesive layer between the third composite part and the detail assembly.

7. The method of claim 1, further including:

laying up at least one of the first and second composite parts on a compensated layup tool.

8. The method of claim 1, wherein the step of assembling the first and second composite part includes:

installing a radius filler within a notch between back-to-back bend radii of the first and second composite part.

9. The method of claim 1, further including:

providing at least one of the first and second composite part as a composite laminate formed of preimpregnated composite plies.

10. The method of claim 1, further including:

providing the first and second composite part in a configuration such that the detail assembly has one of a blade section, a C-section, an I-section, and a hat section.

11. The method of claim 1, wherein the step of co-bonding the detail assembly to the third composite part includes:

encapsulating the detail assembly and the third composite part in a vacuum bag and without an assembly cure tool; and applying compaction pressure and heat to cure the third composite part while simultaneously bonding the detail assembly to the third composite part.

12. A method of reducing residual stress in a composite assembly, comprising:

assembling a first composite part to a second composite part to form an uncured detail assembly, the first and second composite part each having a flange and a web connected by a bend radius and being assembled such that the web of the first and second composite part are back-to-back;

curing the detail assembly on a compensated cure tool with the flange of the first and second composite part supported on a tool surface compensated for cure shrinkage spring-in and thermally-induced spring-in predicted to occur in the first composite part and second composite part, the cure tool being non-compensated for thermally-induced spring-in predicted to occur in the first and second composite part during curing;

allowing the flange of the first and second composite part to undergo cure shrinkage spring-in and thermally-induced spring-in;

assembling the cured detail assembly to a third composite part that is uncured and which extends across and interconnects the flange of the first and second composite part, an adhesive layer installed between the detail assembly and the third composite part; and co-bonding the detail assembly to the third composite part to form a composite assembly with reduced or non-existent cure shrinkage residual stress in the bend radii of the first and second composite part; and the compensated cure tool configured such that:

a gap exists between the cured detail assembly and the third composite part due to thermally-induced spring-in when the cured detail assembly and the third composite are assembled and at room temperature prior to co-bonding;

the detail assembly is flush with the third composite part due to thermally-induced spring-out when the cured detail assembly and the third composite are assembled and at cure temperature during co-bonding; and the detail assembly having thermally-induced residual stress at room temperature and after co-bonding.

13. The method of claim 12, wherein:

the compensated cure tool is compensated for cure shrinkage spring-in by an amount such that when the detail assembly is at room temperature after cure, the flanges are gapped with the third composite part.

14. The method of claim 12, wherein the step of assembling the detail assembly to the third composite part comprises:

laying up an uncured skin panel and an uncured base laminate on an assembly cure tool prior to co-bonding the uncured detail assembly to the uncured skin panel and uncured base laminate.

15. The method of claim 12, further including:

laying up at least one of the first and second composite parts on a compensated layup tool.

16. The method of claim 12, wherein the step of assembling the first composite part and the second composite part includes:

installing a radius filler within a notch between back-to-back bend radii of the first composite part and second composite part when assembled.

17. The method of claim 12, further including:

providing the first composite part and the second composite part in a configuration such that the detail assembly has one of the following cross-sections: a blade section, a C-section, an I-section, a hat section.

18. The method of claim 12, wherein the step of co-bonding the detail assembly to the third composite part includes:

encapsulating the detail assembly and the third composite part in a vacuum bag and without an assembly cure tool; and applying compaction pressure and heat to cure the third composite part while simultaneously bonding the detail assembly to the third composite part.

19. A method of forming an integrally-stiffened panel assembly, comprising:

assembling a first composite part, a second composite part, and a radius filler to form an uncured detail assembly, the first and second composite part each having a flange and a web connected by a bend radius, the web of the first and second composite part being in back-to-back contact with one another and forming a notch between the bend radii for receiving the radius filler;

curing the detail assembly on a compensated cure tool with the radius filler and the flange of the first and second composite part supported on a tool surface compensated for cure shrinkage spring-in and non-compensated for thermally-induced spring-in predicted to occur in the first and second composite part during curing;

allowing cure shrinkage spring-in to occur in the flange of the first and second composite part after curing of the detail assembly;

assembling the cured detail assembly to an uncured base laminate and uncured skin panel located beneath the base laminate and supported on an assembly cure tool, an adhesive layer installed between the base laminate and the detail assembly, the base laminate extending across and interconnecting the flange of the first and second composite part; and co-bonding the detail assembly to the uncured base laminate and uncured skin panel on an assembly cure tool to form an integrally-stiffened panel assembly with reduced or non-existent cure shrinkage residual stress in the radius filler and the bend radii of the first and second composite part; and the compensated cure tool configured such that:
- a gap exists between the cured detail assembly and the third composite part due to thermally-induced spring-in when the cured detail assembly and the third composite are assembled and at room temperature prior to co-bonding;
- the detail assembly is flush with the third composite part due to thermally-induced spring-out when the cured detail assembly and the third composite are assembled and at cure temperature during co-bonding; and the detail assembly having thermally-induced residual stress at room temperature and after co-bonding.

20. The method of claim 19, wherein:
the detail assembly has one of a blade section, a C-section, an I-section, a J-section, and a hat section.

* * * * *